United States Patent
Lee

(10) Patent No.: US 7,171,157 B2
(45) Date of Patent: Jan. 30, 2007

(54) SYSTEM AND METHOD FOR MONITORING AND TESTING NETWORK ELEMENTS

(75) Inventor: Yong-Jae Lee, Gyeonggi-Do (KR)

(73) Assignee: LG-Nortel Co., Ltd, Seoul (KR)

( * ) Notice: Subject to any disclaimer, the term of this patent is extended or adjusted under 35 U.S.C. 154(b) by 475 days.

(21) Appl. No.: 10/218,635

(22) Filed: Aug. 15, 2002

(65) Prior Publication Data

US 2003/0037155 A1 Feb. 20, 2003

(30) Foreign Application Priority Data

Aug. 17, 2001 (KR) .............................. 2001-49694

(51) Int. Cl.
- *H04B 3/36* (2006.01)
- *H04B 17/00* (2006.01)
- *H04Q 7/20* (2006.01)
- *H04M 1/24* (2006.01)
- *H04M 3/08* (2006.01)

(52) U.S. Cl. ....................... 455/8; 455/67.11; 455/424; 379/27.04

(58) Field of Classification Search ............. 455/67.11, 455/424, 466, 8; 379/27.04
See application file for complete search history.

(56) References Cited

U.S. PATENT DOCUMENTS

| 5,425,076 A | * | 6/1995 | Knippelmier | ............ | 379/27.04 |
| 5,551,056 A | * | 8/1996 | Koponen et al. | ............... | 455/8 |
| 6,745,011 B1 | * | 6/2004 | Hendrickson et al. | ... | 455/67.11 |
| 6,748,212 B2 | * | 6/2004 | Schmutz et al. | ............ | 455/424 |

* cited by examiner

*Primary Examiner*—William D. Cumming
(74) *Attorney, Agent, or Firm*—Fleshner & Kim, LLP

(57) ABSTRACT

A system for monitoring and testing network elements of a wireless communication network includes at least one air surveillance device (ASD) connected to a target network element through a wire or wireless channel, and an air surveillance and management server (ASMS) which communicates with the ASD through the wireless communication network. The ASD collects radio environment data in real time, tests qualities of services around the target network element, and transmits the collected radio environment and test result data to the ASMS. The ASMS remotely controls the ASD, analyzes the data received from the ASD, and display an analysis result on a graphic user interface (GUI).

30 Claims, 15 Drawing Sheets

SYSTEM AND METHOD FOR MONITORING AND TESTING NETWORK ELEMENTS

BACKGROUND OF THE INVENTION

1. Field of the Invention

The present invention relates to a radio environment analysis and, in particular, to a system and method for monitoring and testing remote network elements in real time.

2. Background of the Related Art

As the communications industry evolves, network structures have become more complicated and radio communication technology has advanced at a very rapid pace. In the midst of these trends, telecommunication carriers are involved in a heated competition to secure more subscribers. In an attempt to gain an advantage in the market, carriers are lowering service charges. They are also seeking to increase profits by improving service quality, improving subscriber satisfaction, and minimizing network maintenance costs. To meet subscribers' demands for high quality communications, carriers are now required to design streamed networks with cell planning and must also monitor radio environment using a propagation measurement and analysis system.

FIG. 1 is a schematic view showing a conventional wireless communication system. This system includes a plurality of mobile terminals 10, base transceiver station (BTS) 12 and repeaters 14 for relaying communication between the mobile terminals 10, base station controllers (BSC) 13 for controlling an overall management of the BTS's, MSC's 11 which are connected to fixed networks such as the PSTN, ISDN, etc. and which perform the switching functions needed to connect the mobile terminals 10 to fixed network subscribers or to other mobile subscribers, HLR's (not shown) storing all subscriber information including the subscriber's access rights and the services he/she has subscribed to, and a network management system (NMS) 15 for monitoring and troubleshooting traffic congestion and malfunctioning of the network elements.

This communication system is further provided with a base station manager (BSM) 16 for managing and maintaining the BTS's 12 based on information collected through the dedicated lines between the BTS's 12 and the BSC's 13.

Unlike the BTS's 12 that are connected via the dedicated lines, the repeaters 14 typically communicate with the BTS's 12 through a common air interface (CAI) due to economical problems. Even if small size equipment such as repeaters 14 are connected to the BTS 12 through dedicated lines, data for managing and maintaining the equipment should be previously collected at the BTS 12 and then sent to a monitoring center for analysis.

In order to monitor the operating conditions of the small size equipment in a conventional wireless system, the equipment is typically provided with sensors attached at main parts of the equipment and a separate modem, which is connected to a public network through a physical line. The management center collects the data gathered by the sensors by periodically polling the equipment and receiving event (interrupt) signals from the equipment whenever a malfunction is detected by the sensors.

To perform this monitoring function, telecommunication carriers have considered building a separate management network for the sensors and modems used to monitor the communications network, and especially for monitoring remote equipment located in the network at low density areas. The construction and management of this separate network is highly undesirable because it is expected to add significantly to the overall cost of providing telecommunication services to subscribers. For this reason, carriers have hesitated to install monitoring devices for small size equipment such as repeaters located at remote and low density areas. The failure to monitor the performance of small size equipment has caused a deterioration in service quality.

Furthermore, since each sensor monitors only the associated part of the equipment on which the sensor is mounted regardless of other parts of the same equipment, it is difficult to obtain a reliable status report on and an integrated analysis of the whole equipment.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

The present invention has been made in an effort to solve the above problems.

It is an object of the present invention to provide a system and method for monitoring and testing a network element using an air surveillance device (ASD) installed at the network element, such that an air surveillance and management server (ASMS) can receive reliable radio environment data and/or on-demand status data from the network element and then control the network element based on the collected data.

It is another object of the present invention to provide a system and method for monitoring and testing network elements which measures various parameters associated with service quality, and/or tests connection establishment and connection maintenance regardless of service area characteristics.

These and other objects and advantages of the present invention are achieved by providing a system for monitoring and testing remote network elements which includes at least one air surveillance device (ASD) connected to a target network element through a wire or wireless channel, and an air surveillance and management server (ASMS) which communicates with the ASD through the wireless communication network.

The ASD includes a wireless communication module which is used for performing various service quality tests around the target network element and communicating with the ASMS; a main control unit having a CPU, storage means, and an I/O controller connected to each other through a data bus, the main control unit controlling the wireless communication module; a power supplier for supplying D/C voltage to each part of the ASD; and a communication interface for connecting the ASD to the network element such as a BTS and repeater.

The ASD performs a call setup test, connection maintenance test, and other tests for supplementary services provided by a telecommunication carrier.

The wireless communication module communicates with the ASD using SMS messages.

To achieve the above objects, the method for monitoring and testing remote network elements according to the present invention comprises the steps of loading an ASD operation program, collecting basic radio environment data around the target network element, determining whether or not a counter ends up, entering a scheduled real time radio environment reporting mode if the counter ends up, determining whether or not there is an event reporting a malfunction of the ASD if the counter does not end, entering an event processing mode if there is an event at the step, determining whether or not there is a message received from the ASMS if there is no event, and entering a command execution mode if there is the message received from the ASMS.

In the scheduled real time radio environment reporting mode, the ASD determines whether or not there is the radio environment data previously collected, writes a message containing the radio environment data if there is the previously collected data, and sends the message to the ASMS. The ASD collects the radio environment data if there is no previously collected data.

In the event processing mode the ASD determines whether the event is malfunction occurrence event or malfunction relief event on a specific malfunction item, writes a message containing a malfunction indicator corresponding to the malfunction item if the event is the malfunction occurrence event, and sends the message to the ASMS. The ASD writes and sends a message containing a malfunction relief indicator corresponding to the malfunction item if the event is the malfunction relief event.

In the command execution mode, the ASD determines whether a command contained in the message received from the ASMS is a parameter update, specific data collection, or specific item test command, extracts parameter update information from respective fields of the message if the command is the parameter update command, resets parameters of the ASD operation program based on the parameter update information, and sends a message indicating that the parameters are updated.

The ASD enters a specific data collection procedure if the command is the specific data collection command. The specific data collection procedure comprises the steps of determining whether or not there is previously collected specific radio environment data requested by the command, writing a message containing the specific data if there is the specific data requested by the command, and sending the message to the ASMS. The specific data collection procedure further comprises the step of collecting the specific radio environment data if there is no the data requested by the command.

The ASD enters specific item test procedure if the command is the specific item test command. The specific item test procedure comprises the steps of determining whether or not the specific item test command is a call setup test command, performing the call setup test if the specific item test command is the call setup test command, determining whether or not the specific item test command is a connection maintenance test command if the specific item test command is not the call setup test command, performing the connection maintenance test if the specific item test command is the connection maintenance test command, determining whether or not the specific item test command is a SMS function test command if the specific test command is not the connection maintenance test command, performing the SMS function test if the specific item test command is the SMS function test command, determining whether or not the specific item test command is parameter configuration command if the specific item test command is not the SMS function test command, and performing the parameter configuration if the specific item test command is the parameter configuration command.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

The accompanying drawings, which are incorporated in and constitute a part of the specification, illustrate an embodiment of the invention, and together with the description, serve to explain the principles of the invention.

DETAILED DESCRIPTION OF PREFERRED EMBODIMENTS

Figure 1:
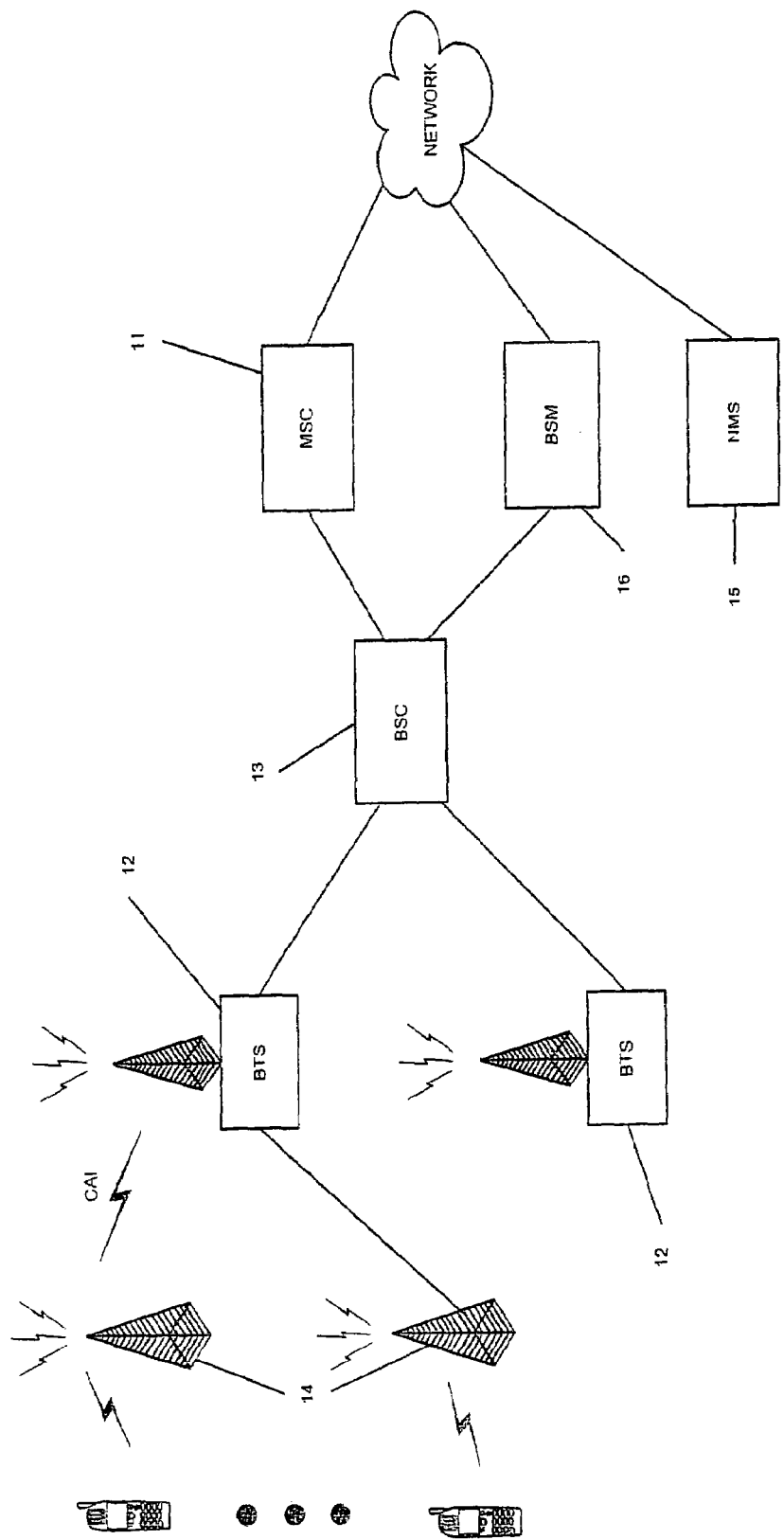
FIG. 1 is a schematic view showing a conventional wireless communication system.
Figure 2:
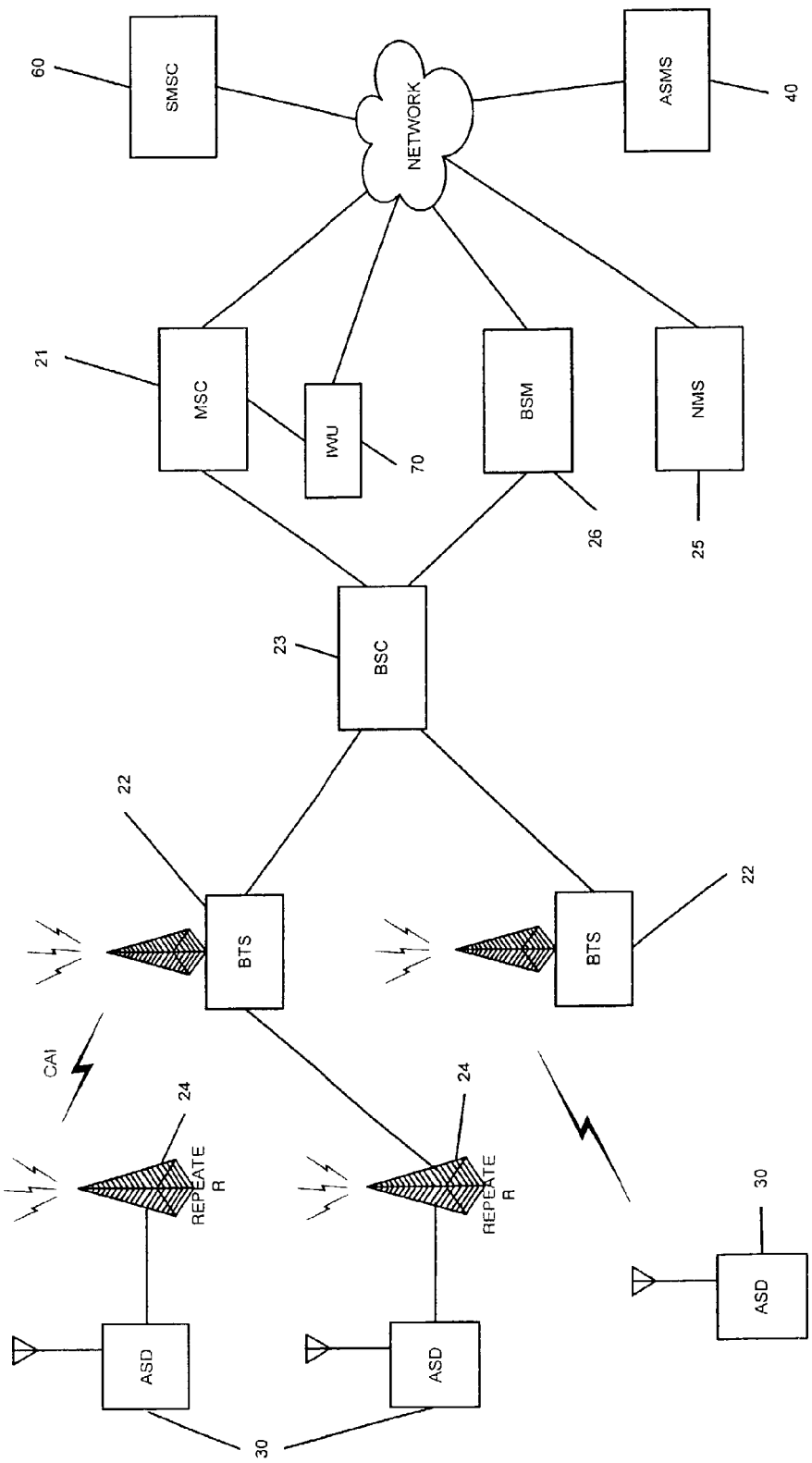
FIG. 2 is a schematic view showing a system for monitoring and testing remote network elements according to a preferred embodiment of the present invention.

FIG. 2 shows a system for monitoring and testing network elements according to one embodiment of the present invention. The system comprises basic network elements such as a mobile switching center (MSC) 21, HLR (not shown), a base transceiver station (BTS) 22, base station controller (BSC) 23, repeaters 24, network management system (NMS) 25, and base station manager (BSM) 26. The system additionally includes at least one Air Surveillance Device (ASD) 30 connected to a small-size network equipment such as, for example, BTS 22 or a repeater 14 through a wire or wireless channel so as to monitor and test the network element, and an Air Surveillance Management Server (ASMS) 40 for receiving radio environment data and malfunction data from the ASD 30 and managing the ASD 30 based on the data from the ASD.

The ASD measures and analyzes, preferably in real time, radio environment and qualities of services provided by the carrier at the area where an associated small-size network element (e.g., BTS 22 or repeater 24) is located, and reports measurement and analysis results to the ASMS 40. The ASD can also test supplementary services as well as voice communications using the BTS and/or repeaters and report the test results to the ASMS 40.

The ASMS 40 may be implemented, for example, as UNIX equipment and is preferably located at a center of the wireless communication network, in order to allow the ASMS to remotely monitor the operation conditions of all the network elements such as BTSs 22 and repeaters 24 through their associated ASDs 30. The ASMS may also control the respective elements based on data gathered from the ASDs. Also, data about the operation state of the respective network elements may be output in various forms by the administrator.

The ASDs and the ASMS communicate the messages associated with network element monitoring and testing to each other using short message service centers (SMSCs) 60 and inter-working units (IWUs) 70 belonging to the telecommunication carrier.

Figure 3:
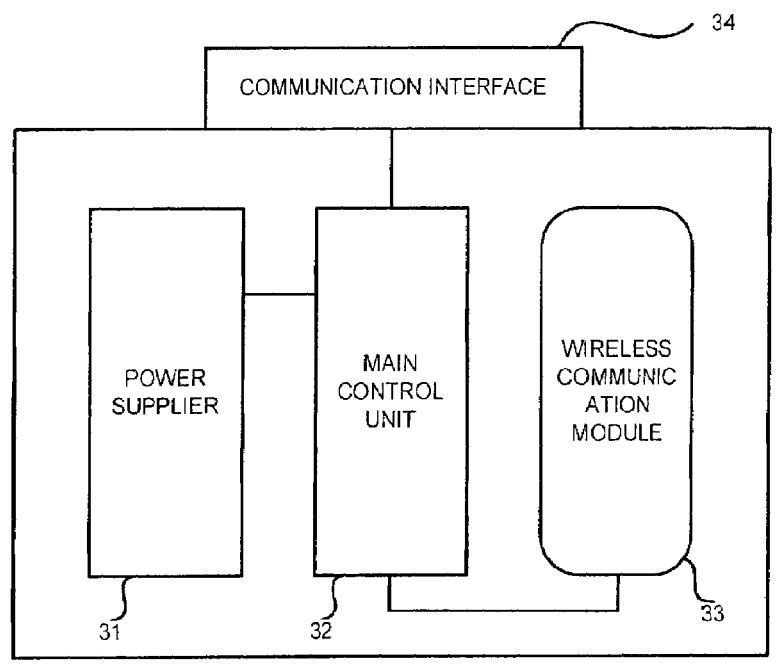
FIG. 3 is a block diagram illustrating a ASD of the system of FIG. 2.
Figure 4:
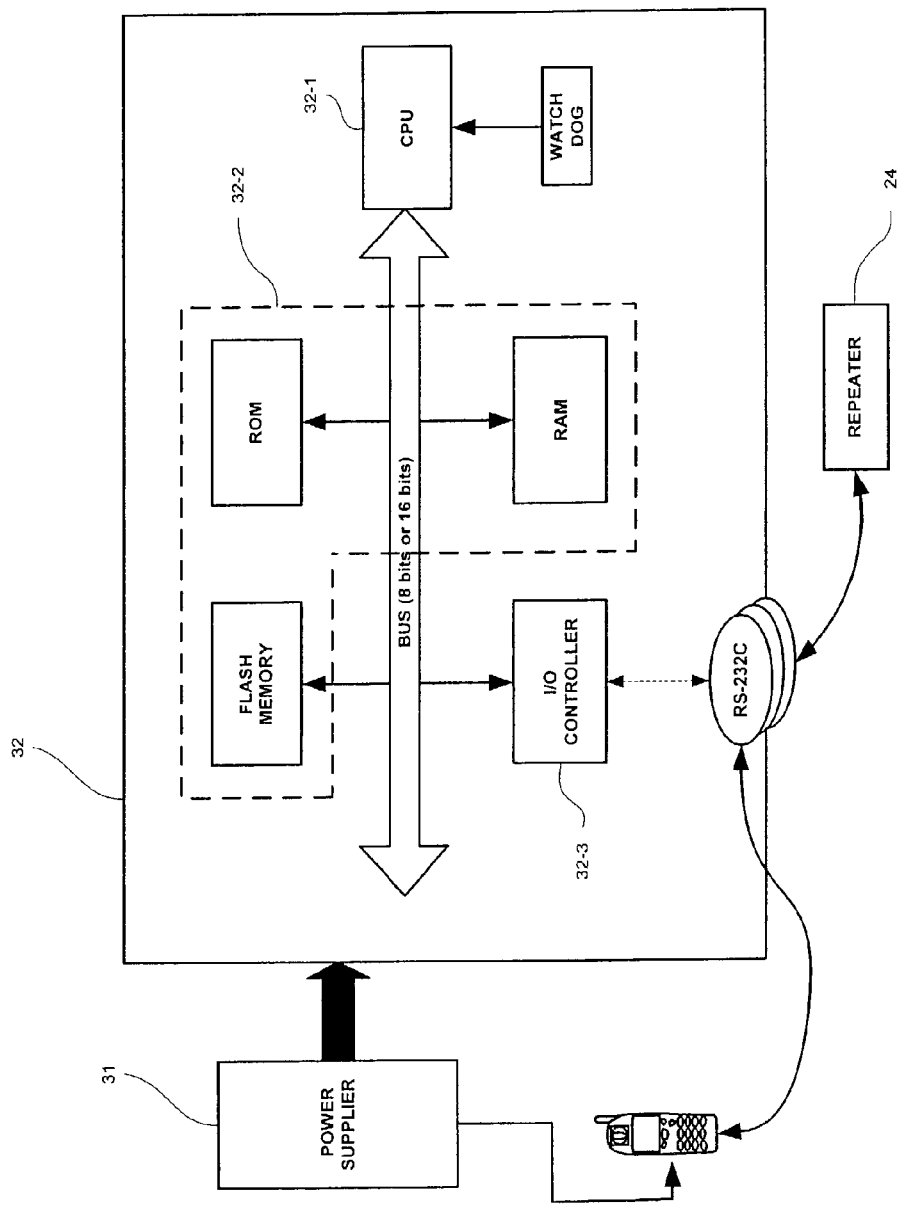
FIG. 4 is a block diagram illustrating a main control unit of the ASD of FIG. 3.

FIG. 3 shows a structure of an ASD in accordance with one embodiment of the present invention, and FIG. 4 shows a main control unit of this ASD. As shown, the ASD comprises a power supplier 31, a main control unit 32, a wireless communication module 33, and a communication interface 34.

The power supplier 31 is preferably a switching mode power supply (SMPS) module which converts AC voltage from an exterior power source (not shown) into DC voltage so as to distribute the DC voltage to inner parts of the ASD.

The main control unit 32 includes a CPU 32-1, a storage unit 32-2 having a ROM, RAM, and Flash memory (EPROM), and an I/O controller 32-3. These elements are connected to each other through a bus 32-4. The main control unit 32 controls all parts of the ASD and communications with the BTSs 22 and repeaters 24 through the communication interface 34.

The wireless communication module 33 maybe provided with a wireless communication function identical to that of a cellular or other type of mobile phone so as to be used for measuring service quality of an associated network element and for transmitting measured data to the ASMS.

The communication interface 34 maybe provided with a RS-232C port to allow the ASD to be connected to the BTS 22 or repeater 24 therethrough.

Figure 5:
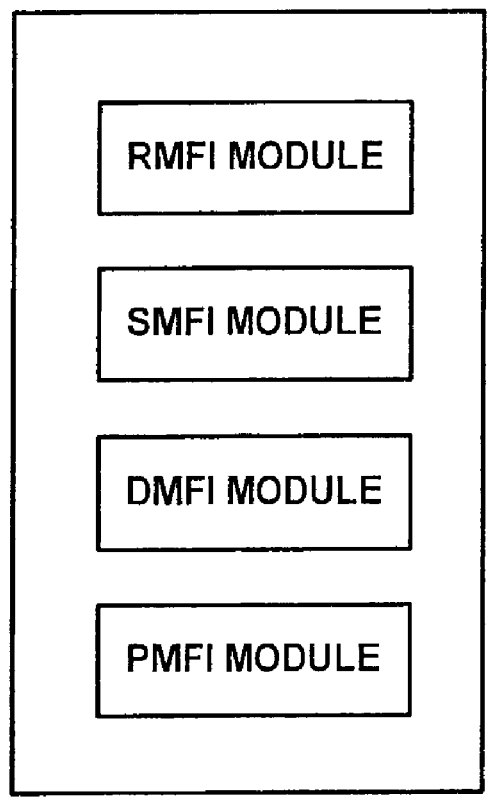
FIG. 5 is a block diagram illustrating an ASD operation program embedded in the ASD of FIG. 3.

FIG. 5 is a block diagram showing a structure of an ASD operating program embedded in the ASD in accordance with one embodiment of the invention. As shown, the program comprises a repeater monitoring function interface (RMFI) module providing a logical interface to the associated BTS 22 or repeater 24, a short message function interface (SMFI) module for providing a logical interface to the SMSC 60 for transmitting the collected data to the ASMS, a diagnostic monitor function interface (DMFI) module for providing a logical interface for receiving diagnostic and control data from the ASMS, and a process management function interface (PMFI) module for controlling processes on the ASD.

Operation of the ASD 30 will now be described hereinafter. The ASD communicates control messages with the ASMS 40 through the wireless communication module 33 and communicates with an associated BTS 22 or repeater 24 through the communication interface 34, so as to control the BTS 22 or repeater 24 and/or test a voice communication service and other supplemental services by executing a control message received from the ASMS 40. The ASD then feeds back the execution/test results and associated information to the ASMS using the short message service (SMS) function of the wireless communication processor 33.

The wireless communication module 33 may also monitor and analyze the radio environment in coverage of the target or associated BTS 22 or repeater 24 through the CAI and report the analysis results to the ASMS using the SMS function. The ASD may analyze service quality by establishing a call connection to a mobile terminal, if required, and then report a malfunction of the BTS 22 or repeater 24 to the ASMS if the analysis result is bad.

For this purpose, the ASD is preferably provided with a key-pad emulation function for collecting required data from a mobile terminal, and for performing various tests required from the ASMS. The ASD may also include a software reset function for resetting one or more of the BTS 22, mobile terminal, and ASD 30 itself.

The ASMS, periodically or by administrator's request, receives the service quality data and call connection/connection maintenance test result data collected by the ASD, and displays the conditions of all the elements distributed in the network through the GUI.

Figure 6:
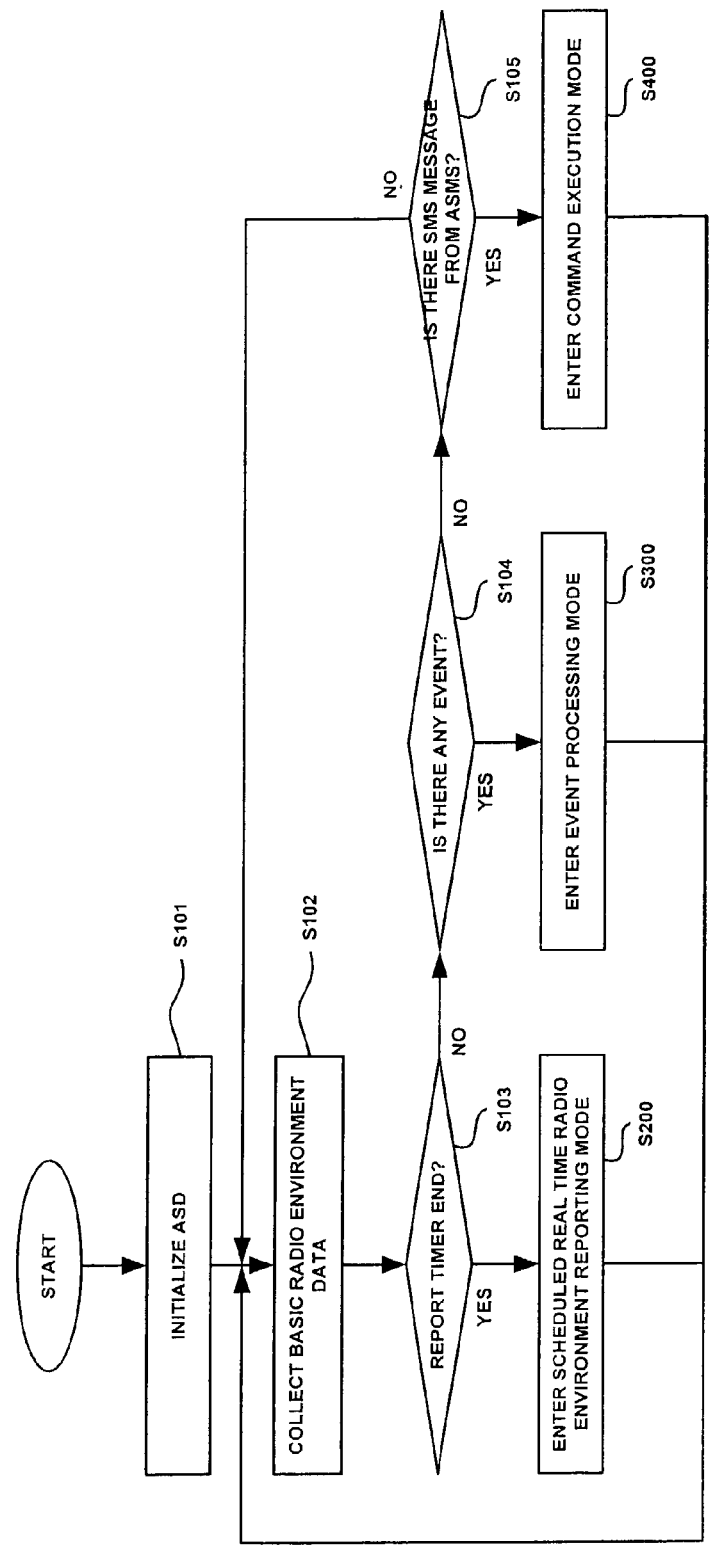
FIG. 6 is a flowchart illustrating a method for monitoring and testing remote network elements according to the present invention.

A method for monitoring and testing remote network elements according to an embodiment of the present invention will now be described with reference FIG. 6 to FIG. 15. FIG. 6 is a flowchart illustrating a method for monitoring and testing remote network elements according to the present invention. Once the ASD 30 is turned on, the ASD operation program is loaded to set parameters such as a report counter for periodically reporting radio environment data, malfunction items that indicate various malfunctions of the monitored element and threshold values of the respective malfunction items, and etc. with predetermined values at step S101.

After initialization, the ASD collects basic radio environment data about the target or associated network equipment at step S102, and then determines whether or not a cycle of the report counter ends up at step S103.

If it is determined that the cycle of the report counter ends up, the ASD enters a scheduled real-time radio environment reporting mode at step S200, and then returns to step S102 after completing executions in the scheduled real time radio environment reporting mode.

If the report counter does not end, the ASD checks present set malfunction items and determines whether the present values of respective malfunction items are greater than the threshold values of the corresponding malfunction items at step S104. The report counter increases until the value of the counter is equal to a predetermined number and repeats the loop.

If it is determined that the value of at least one malfunction item is greater than a threshold value, the ASD enters an event processing mode, at step S300, and returns to step S102 after completing executions in the event processing mode.

If there is no malfunction item at step S104, the ASD determines whether or not there is an SMS message received from the ASMS at step S105. If an SMS message is received from the ASMS, the ASD enters a command execution mode at step S400, and returns to step S102 after completing executions in the command execution mode. On the other hand, if there is no SMS message from the ASMS, the ASD returns to step S102 to continue collecting basic parameters.

Figure 7:
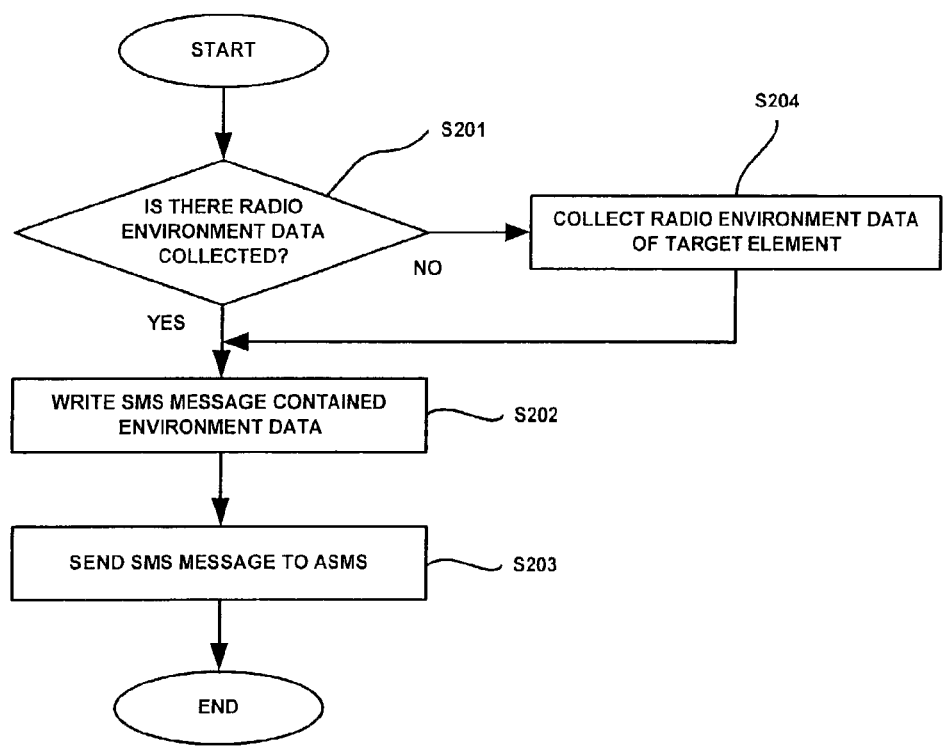
FIG. 7 is a flowchart illustrating the scheduled real time radio environment reporting mode of FIG. 6 in more detail.

FIG. 7 is a flowchart showing steps included in a scheduled real-time radio environment reporting mode of FIG. 6 in more detail. As shown, the ASD determines whether or not there is previously collected radio environment data at step S201. If there is collected radio environment data, the ASD writes an SMS message contained the radio environment data at step S202 and sends the SMS message to the ASMS at step S203. On the other hand, if there is no data previously collected, the ASD immediately collects radio environment data about the target or associated equipment at step S204, and then carries out steps S202 and S203.

Figure 8:
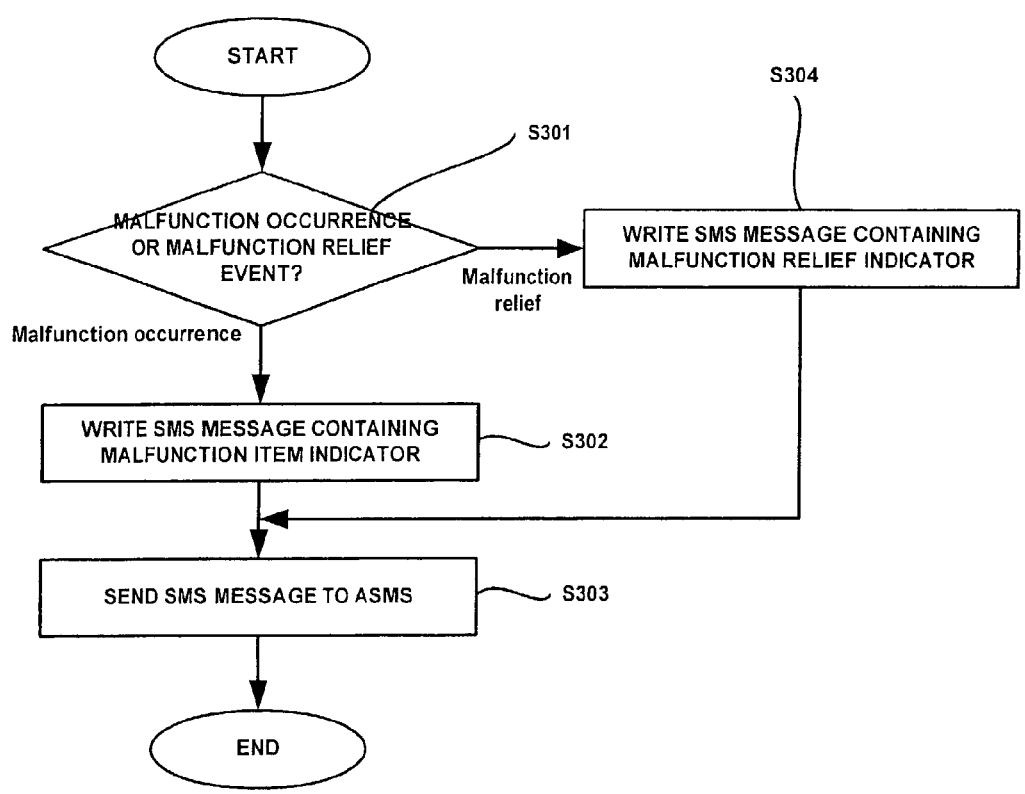
FIG. 8 is a flowchart illustrating the event processing mode of FIG. 6 in more detail.

FIG. 8 is a flowchart showing steps included in the event processing mode of FIG. 6 in more detail. As shown, once the ASD enters the event processing mode, the ASD determines whether or not an event is associated with a malfunction occurrence or a malfunction relief at step S301. If it is determined that the event is a malfunction occurrence event, the ASD writes an SMS message contained malfunction item indicator corresponding to the item at step S302 and sends the SMS message to the ASMS at step S303. On the other hand, if it is determined that the event is a malfunction relief event, the ASD writes an SMS message contained a malfunction relief indicator corresponding to the malfunction item at step S304 and sends the SMS message to the ASMS 40.

Figure 9:
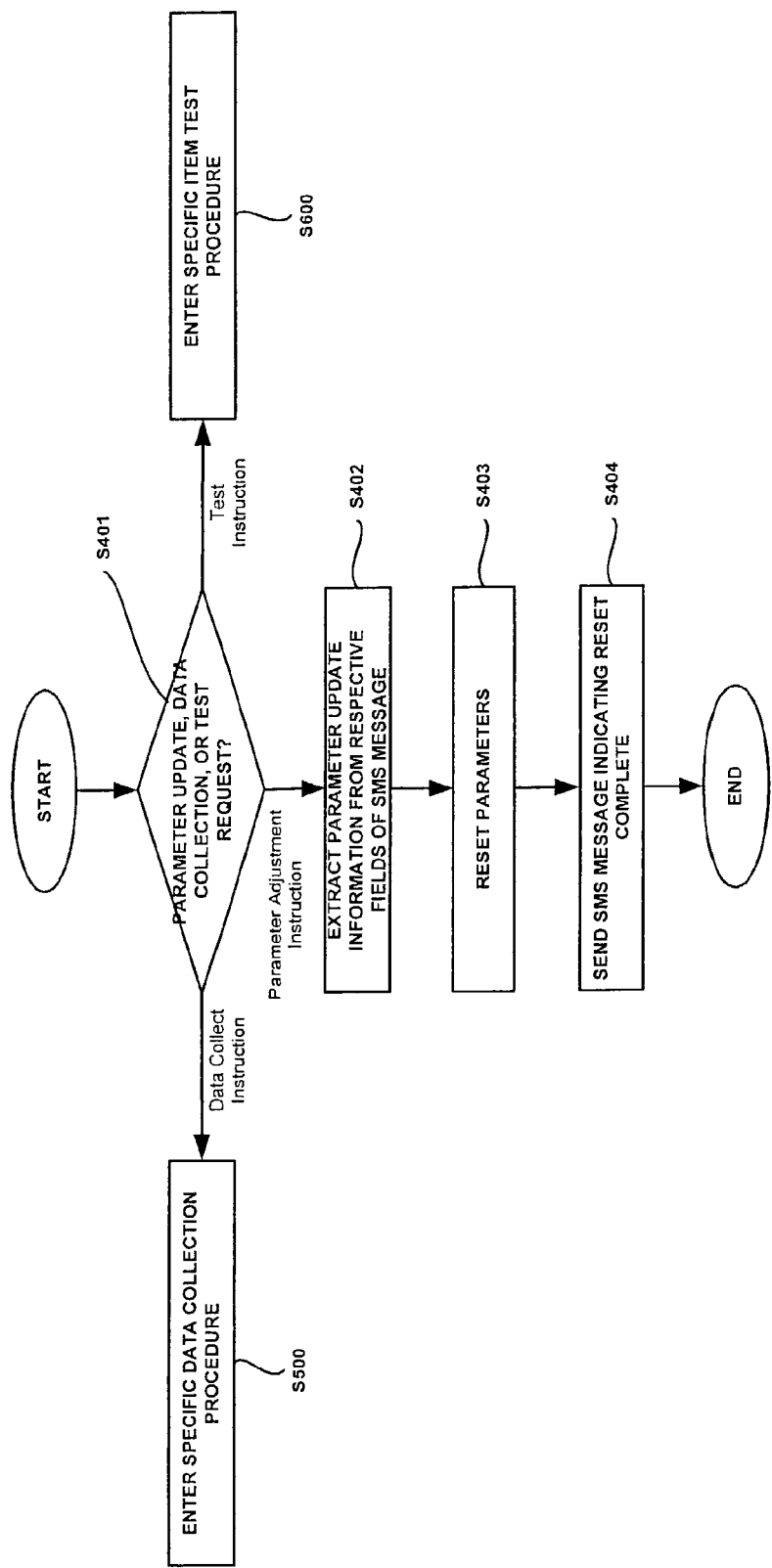
FIG. 9 is a flowchart illustrating the command execution procedure of FIG. 6 in more detail.

FIG. 9 is a flowchart showing steps included in the command execution mode of FIG. 6 in more detail. As shown, the ASD determines whether the SMS message received from the ASMS contains parameter update, data collection, or specific item test command at step S401. If it is determined that the command is associated with one of the parameter update, specific data collection, or specific item test, the ASD enters a corresponding procedure, i.e., a parameter update procedure, specific data collection procedure, or specific item test procedure.

Once entering the parameter update procedure, the ASD extracts parameter update data from respective fields of the SMS message at step S402, updates the previously stored parameters with the newly received ones at step S403, and sends a SMS message indicating a successful parameter update to the ASMS at step S404. At step S401, if it is determined that the command is associated with the specific data collection, the ASD enters the specific data collection procedure at step S500.

Figure 10:
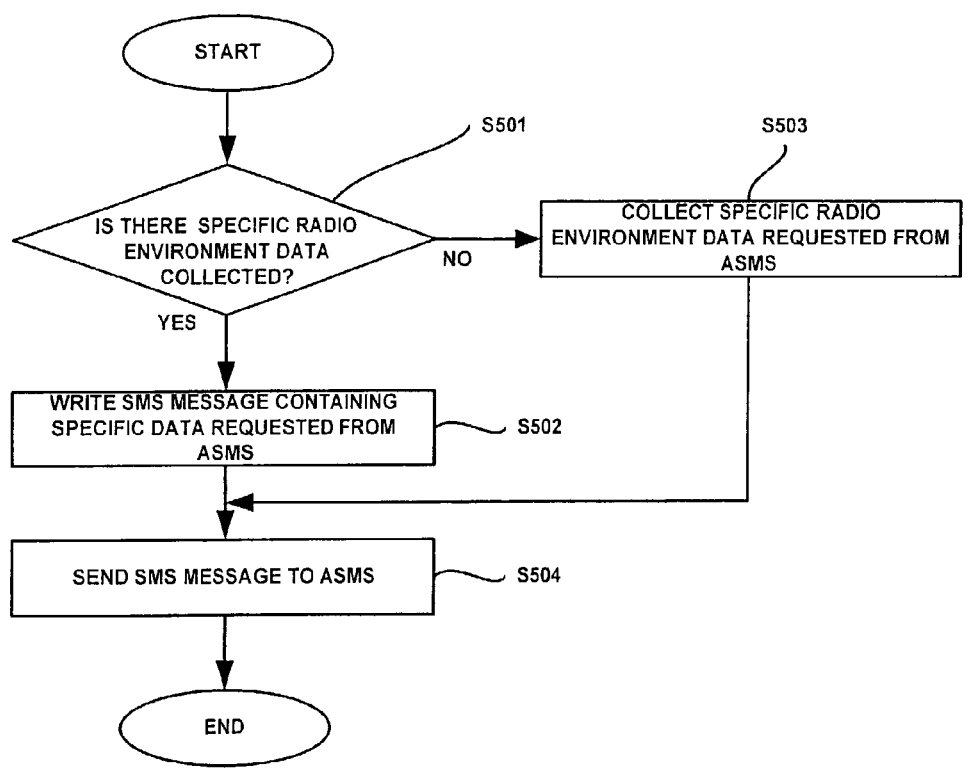
FIG. 10 is a flowchart illustrating the specific data collection procedure of FIG. 9 in more detail.

FIG. 10 is a flowchart showing steps included in the specific data collection procedure of FIG. 9 in more detail. As shown, once the ASD enters the specific data collection procedure, the ASD determines whether or not there is previously collected specific data at step S501. If there is specific data requested by the ASMS, the ASD writes an SMS message containing the specific data at step S502 and then sends the SMS message to the ASMS at step S504. If there is no specific data previously collected, the ASD immediately collects specific radio environment data requested from the ASMS at step S503 and performs the steps S502 and S503. At step S401 of FIG. 9, if it is determined that the command is associated with specific items tests, the ASD enters the specific item test procedure.

Figure 11:
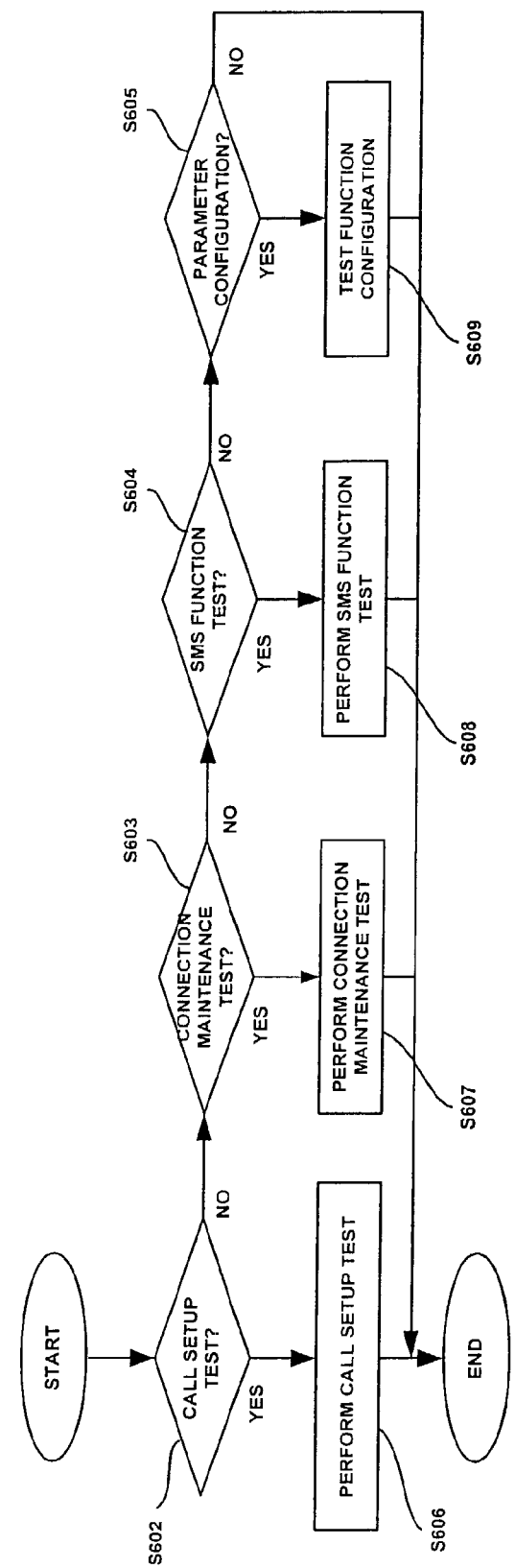
FIG. 11 is a flowchart illustrating the specific item test procedure of FIG. 9 in more detail.

FIG. 11 is a flowchart showing steps included in the specific item test procedure of FIG. 9 in more detail. As shown, the ASD determines whether or not the command indicates a call setup test at step S602. If the command field indicates a call setup test, the ASD performs the call setup test at step S605. If the command does not indicate a call setup test, the ASD determines whether or not the command indicates a connection maintenance test at step S603.

If the command indicates a connection maintenance test, the ASD performs a connection maintenance test at step S607. If the command does not indicate a connection maintenance test, the ASD 30 determines whether or not the command indicates an SMS function test at step S604.

If it is determined that the command indicates an SMS function test, the ASD performs an SMS function test at step S608. If the command does not indicate an SMS function test, the ASD determines whether or not the command indicates a test function configuration at step S605. If the command indicates a test function configuration, the ASD performs the test function configuration at step S609.

Figure 12:
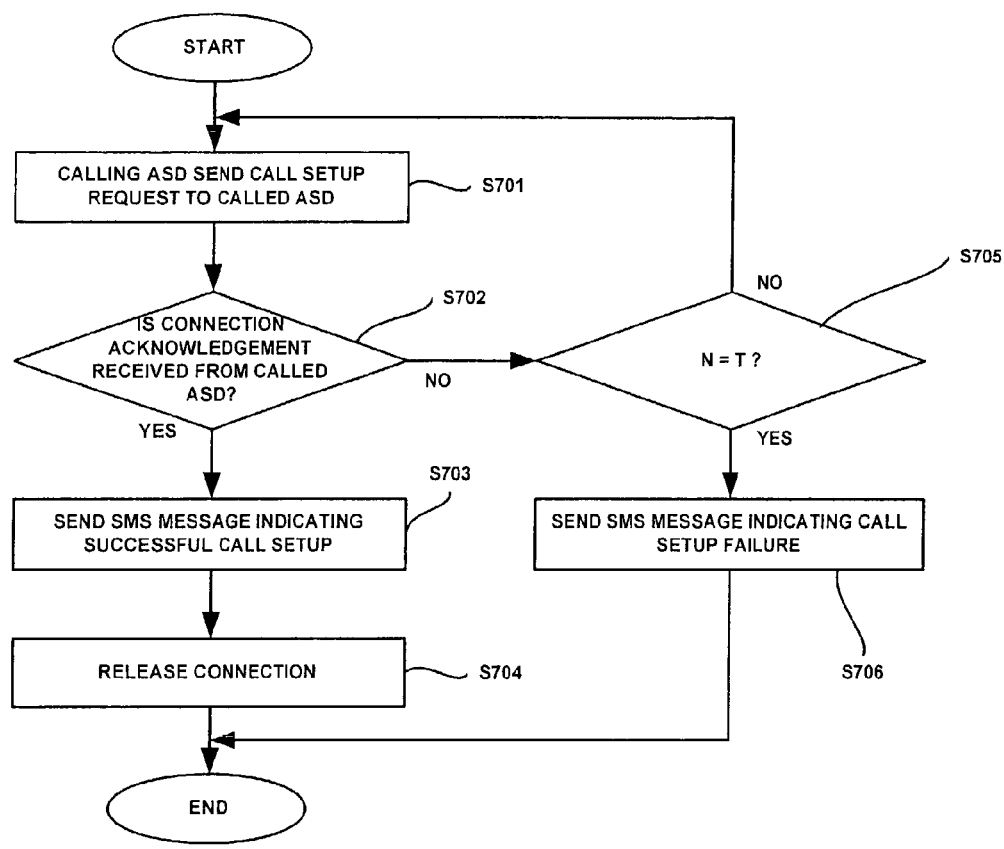
FIG. 12 is a flowchart illustrating the call setup test procedure in a calling ASD.

FIG. 12 is a flowchart showing steps included in the call setup test procedure in a calling ASD. As shown, the calling ASD sends a call setup request to a called ASD at step S701, and waits to receive a connection acknowledgment during a predetermined period at step S702. If the calling ASD receives the connection acknowledgment from the called ASD during the predetermined period, the calling ASD sends an SMS message indicating a successful call setup to the ASMS at step S703 and then releases the connection at step S704.

If the calling ASD does not receive a connection acknowledgment from the called ASD during the predetermined period, the calling ASD repeats to send the call setup request until the number (N) of repetitions is equal to a predetermined value (T) at step S705. If N becomes equal to T, the calling ASD sends an SMS message indicating a call setup failure to the ASMS at step S706.

Figure 13:
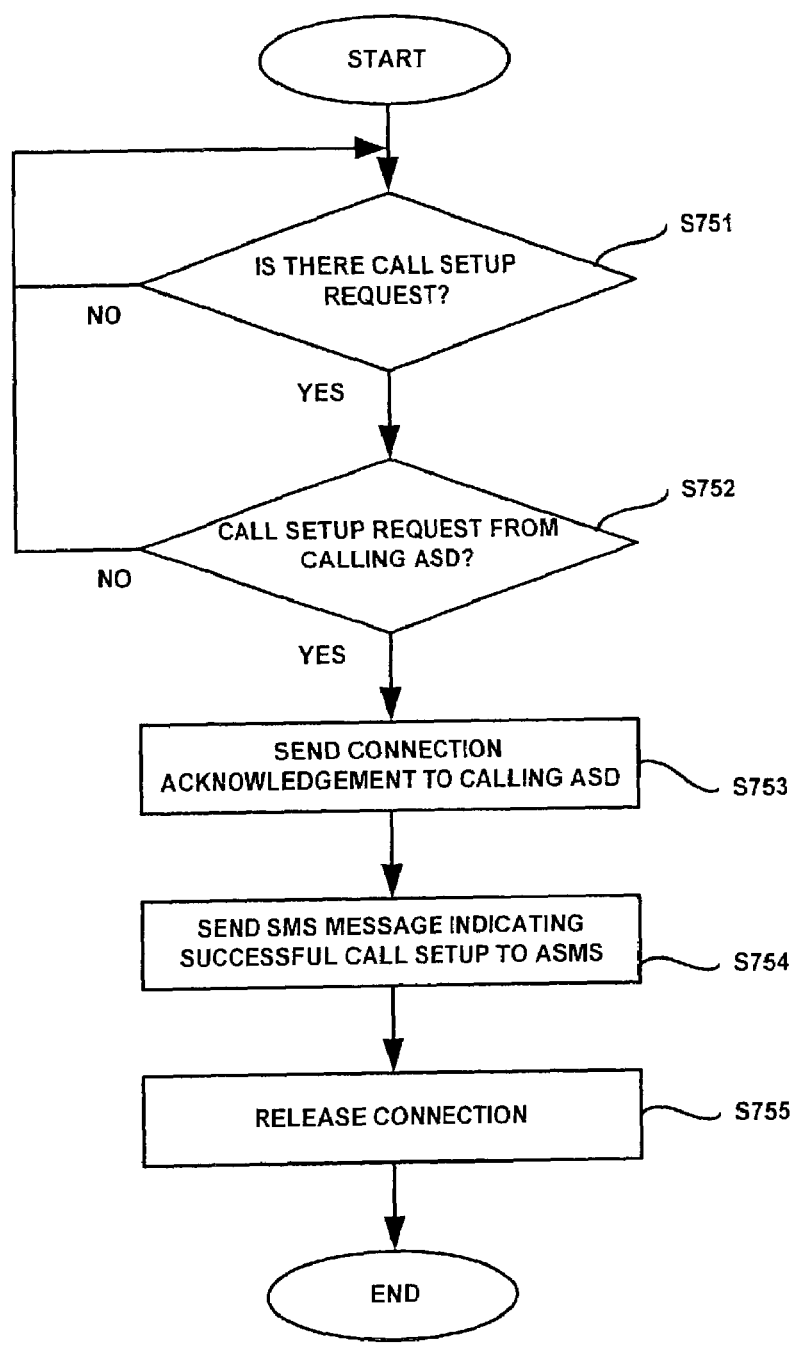
FIG. 13 is a flowchart illustrating call setup test procedure in the called ASD.

FIG. 13 is a flowchart showing steps included in a call setup test procedure in the called ASD. As shown, the called ASD determines whether or not there is a call setup request at step S751, and then determines whether or not the call setup request is sent by the calling ASD at step S752 if there is call setup request. If it is determined that the call setup request is sent by the calling ASD, the called ASD sends a connection acknowledgment to the calling ASD at step S753, and then sends an SMS message indicating the successful call setup to the ASMS at step S754. After sending the SMS message, the called ASD releases the connection at step S755.

Figure 14:
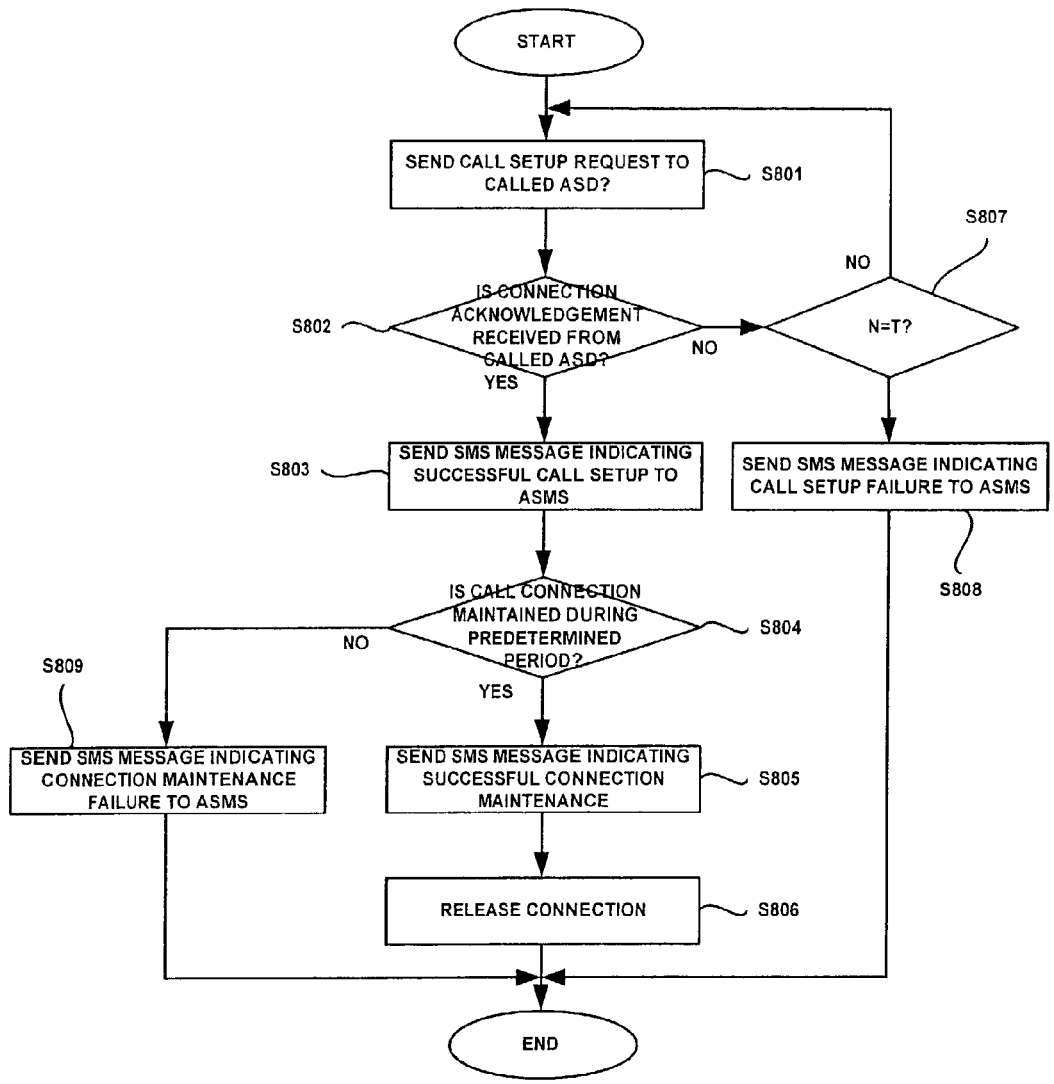
FIG. 14 is a flowchart illustrating a connection maintenance test procedure in the calling ASD.

FIG. 14 is a flowchart showing steps included a connection maintenance test procedure in the calling ASD. As shown, the calling ASD sends a call setup request to the called ASD at step S801 and waits to receive a connection acknowledgment from the called ASD during a predetermined period at step S802.

If there is no connection acknowledgment from the called ASD during the predetermined period, the calling ASD repeats to send the call setup request until a number of repetitions (N) is equal to a predetermined value (T) at step S807. If N becomes equal to T, the calling ASD sends an SMS message indicating a call setup failure to the ASMS at step S808.

On the other hand, if the calling ASD receives the connection acknowledgment from the called ASD, the calling ASD sends an SMS message indicating a successful call setup to the ASMS at step S803, and then determines whether or not the connection is maintained during a predetermined period at step S804.

If the connection is maintained during the predetermined period, the calling ASD sends an SMS message indicating successful connection maintenance to the ASMS at step S805 and releases the connection at step S806. On the other hand, if the connection is not maintained during the predetermined period, the calling ASD sends an SMS message indicating a connection maintenance failure to the ASMS at step S809.

Figure 15:
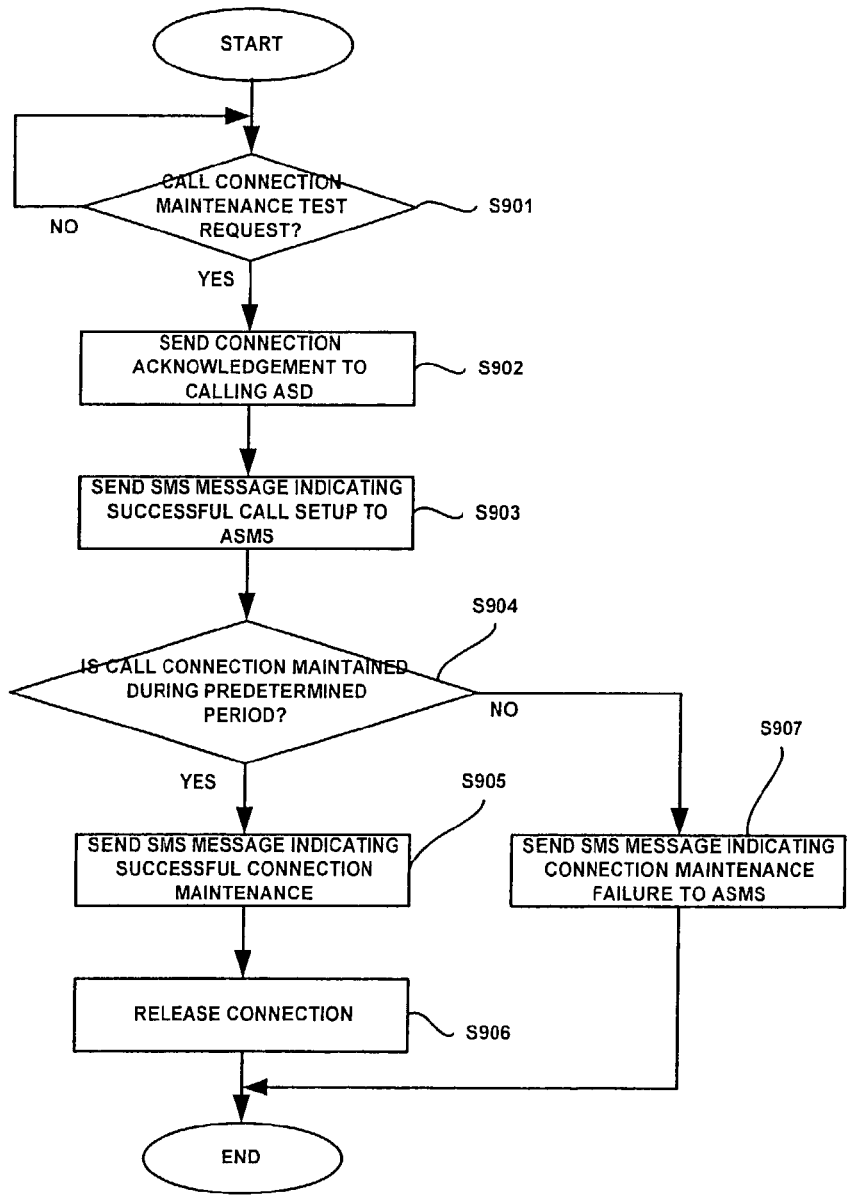
FIG. 15 is a flowchart illustrating a connection maintenance test procedure in the called ASD.

FIG. 15 is a flowchart showing steps included in a connection maintenance test procedure in the called ASD. As shown, the called ASD determines whether or not there is a connection maintenance test request at step S901 and sends a connection acknowledgment to the calling ASD at step S902 if there is a connection maintenance test request. Sequentially, the called ASD sends an SMS message indicating a successful call setup to the ASMS and determines whether or not the connection is maintained during the predetermined period at step S904.

If the connection is maintained during the predetermined period, the called ASD sends an SMS message indicating a successful connection maintenance to the ASMS at step S905 and then releases the connection at step S906. On the other hand, if the connection is not maintained during the predetermined period, the called ASD sends an SMS message indicating a connection maintenance failure to ASMS at step S907.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, since the system for monitoring and testing network equipments according to the present invention allows the ASD to monitor radio environment around target or associated network equipment (such as BTS, repeater, and etc.) and to collect specific radio environmental data requested from the ASMS in real time, it is possible to remotely measure and analyze qualities of supplemental services as well as the voice communication service.

Also, in the system of the present invention, the services qualities of the specific area are measured by the ASD located at that area and the associated data are reported to the ASMS, there is no need to dispatch monitoring/testing personnel for collecting the radio environment data and testing services, resulting in reduction of equipment management costs.

Furthermore, after the radio environment of the area at which the ASD is installed is stabilized, the ASD can be recovered and assigned to other area at which the radio environment monitoring and services tests are required such that the whole costs caused by monitoring/testing equipments can be reduced.

The system of the present invention, still more, allows to collect various kinds of radio environment data, equipment performance and malfunction data, and etc., and integrally analyze these data such that the analysis data can be used for improving the whole network stability and communication reliability, resulting in improvement of the network management efficiency.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for monitoring and/or testing network elements of a wireless communication network, comprising:
   at least one air surveillance device (ASD) connected to a target network element through a wire or wireless channel; and
   an air surveillance and management server (ASMS) communicating with the ASD through the wireless communication network, wherein the ASD collects radio environment data in real time, tests qualities of services around the target network element, and transmits the collected radio environment and test result data to the ASMS, wherein the ASD is operated by an ASD operation program which includes:
      a repeater monitoring function interface (RMFI) module which provides a logical interface to the network element;
      a short message function interface (SMFI) module which provides a logical interface to a short message service center (SMSC) for transmitting the collected data to the ASMS;
      a diagnostic monitor function interface (DMFI) module which provides a logical interface for receiving diagnostic and control data from the ASMS; and
      a process management function interface (PMFI) module which controls processes on the ASD.

2. The system of claim 1, wherein the ASD communicates with the ASMS using a short message service (SMS).

3. The system of claim 1, wherein the ASMS remotely controls the ASD, analyzes the data received from the ASD, and displays an analysis result on a graphic user interface (GUI).

4. The system of claim 1, wherein the network element is one of a base transceiver station (BTS) and a repeater.

5. A system for monitoring and/or testing network elements of a wireless communication network, comprising:
   at least one air surveillance device (ASD) connected to a target network element through a wire or a wireless channel; and
   an air surveillance and management server (ASMS) communicating with the ASD through the wireless communication network, wherein die ASD collects radio environment data in real time, tests qualities of services around the target network element, and transmits the collected radio environment and test result data to the ASMS, wherein the ASD comprises:
      a wireless communication module which performs at least one service quality test around the target network element, and which communicates with the ASMS;
      a main control unit having a CPU, a storage unit, and an I/O controller connected to a data bus, the main control unit controlling the wireless communication module;
      a power supplier for supplying voltage to each part of the ASD; and
      a communication interface which connects the ASD to the network element.

6. The system of claim 5, wherein the network element is one of a base transceiver station (BTS) and a repeater.

7. The system of claim 5, wherein said at least one service quality test includes at least one of a call setup test, connection maintenance test, and tests for performing services provided by a telecommunication carrier.

8. The system of claim 5, wherein the wireless communication module communicates with the ASMS using SMS messages.

9. A method for monitoring and/or testing network elements of a wireless communication network, comprising:
   collecting radio environment data of the network at an air surveillance device (ASD);
   determining whether a mode selection signal is generated, the mode selection signal requesting entrance into one of a plurality of predetermined modes including a command execution mode and an event-processing mode;

entering the command execution mode based on the mode selection signal when the mode selection signal is generated, the command execution mode including performing one of a call setup test, a connection maintenance test, a short message service function test (SMS) and parameter configuration at the ASD based on a command received at the ASD from an air surveillance and management server (ASMS); and entering the event-processing mode, wherein the event-processing mode comprises:
 determining whether an event is a malfunction occurrence event or a malfunction relief event on a specific malfunction item,
 writhing a message containing a malfunction indicator corresponding to the malfunction item if the event is the malfunction occurrence event,
 writing a message containing a malfunction relief indicator corresponding to the malfunction item if the event is the malfunction relief event, and
 sending the message to the air surveillance and management server.

10. The method of claim 9, wherein the predetermined modes further includes a scheduled real-time radio environment reporting mode.

11. The method of claim 10, wherein the scheduled real-time radio environment reporting mode comprises:
 determining whether the radio environment data was previously collected;
 writing a message containing the radio environment data if previously collected; and
 sending the message to the air surveillance and management server.

12. The method of claim 11, wherein the scheduled real-time radio environment reporting mode further comprises:
 collecting the radio environment data if not previously collected.

13. A method for monitoring and/or testing network elements of a wireless communication network, comprising:
 collecting radio environment data of the network at an air surveillance device (ASD);
 determining whether a mode selection, signal is generated, the mode selection signal requesting entrance into one of a plurality of predetermined modes; and
 entering a command execution mode based on the mode selection signal when the mode selection signal is generated, the command execution mode including performing one of a call setup test, a connection maintenance rest, a short message service function test (SMS) and parameter configuration at the ASD based on a command received at the ASD from an air surveillance and management server (ASMS), wherein the command-execution mode comprises:
  determining whether an command contained in a message received from the air surveillance and management server (ASMS) is a parameter update, specific data collection, or specific item test command;
  extracting parameter update information from respective fields of the message if the command is the parameter update command;
  resetting parameters of an ASD operation program based on the parameter update information;
  sending the ASMS a message indicating that the parameters are updated;
  entering specific data collection procedure if the command is the specific data collection command; and
  entering specific item test procedure if the command is the specific item test command.

14. The method of claim 13, wherein the specific data-collection procedure comprises:
 determining whether there is previously collected specific radio environment data corresponding to the command;
 writing a message containing the specific data if the specific data exists corresponding to the command; and
 sending the message to the ASMS.

15. The method of claim 14, wherein the specific data-collection procedure further comprises:
 collecting the specific radio environment data if there is no data corresponding to the command.

16. The method of claim 13, wherein the specific item test procedure comprises:
 determining whether the specific item test command is a call setup test command;
 performing the call setup test if the specific item test command is the call setup test command;
 determining whether the specific item test command is a connection maintenance test command if the specific item test command is not the call setup test command;
 performing the connection maintenance test if the specific item test command is the connection maintenance test command;
 determining whether the specific item test command is a SMS function test command, if the specific test command is not the connection maintenance test command;
 performing the SMS function test if the specific item test command is the SMS function test command;
 determining whether the specific item test command is a parameter configuration command if the specific item test command is not the SMS function test command; and
 performing the parameter configuration if the specific item test command is the parameter configuration command.

17. The method of claim 16, wherein performing the call setup test comprises:
 sending a called ASD a call setup request by a calling ASD;
 determining whether there is a connection acknowledgment from the called ASD;
 sending a message indicating a successful call setup to the ASMS if the calling ASD receives the connection acknowledgment from the called ASD; and
 releasing connection.

18. The method of claim 17, wherein the calling ASD repeats sending the call setup request to the called ASD until a number of repetitions is equal to a predetermined value, and then sending a message from the calling ASD indicating a call setup failure to the ASMS.

19. The method of claim 16, wherein performing the call setup test comprises:
 determining whether there is a call setup request;
 determining whether the call setup request is sent by a calling ASD if there is the call setup request;
 sending a connection acknowledgment to the calling ASD if the call setup request is received from the calling ASD;
 sending a message indicating a successful call setup to the ASMS; and
 releasing connection.

20. The method of claim 16, wherein performing the connection maintenance test comprises:

sending a called ASD a call setup request by a calling ASD;
determining whether there is a connection acknowledgment received from the called ASD;
sending a message indicating a successful call setup to the ASMS if the connection acknowledgment is received from the called ASD;
sending a message indicating a connection maintenance failure to the ASMS if the connection acknowledgment is not received from the called ASD;
determining whether the connection is maintained during a predetermined period;
sending a message indicating successful connection maintenance to the ASMS; and
releasing connection.

21. The method of claim 20, wherein the calling ASD repeats sending the call setup request to the called ASD until a number (N) of repetitions is equal to a predetermined value (T), and if N becomes equal to T, the calling ASD sends a message indicating a call setup failure to the ASMS.

22. The method of claim 16, wherein performing the connection maintenance test comprises:
determining whether or not there is a connection maintenance test request from a calling ASD;
sending a connection acknowledgment to the calling ASD if there is a connection maintenance test request from the calling ASD;
sending a message indicating a successful call setup to the ASMS;
determining whether the connection is maintained during a predetermined period;
sending a message indicating a successful connection maintenance to the ASMS if the connection is maintained during the predetermined period; and
releasing connection.

23. The method of claim 22, wherein performing the connection maintenance test further comprises:
sending a message from the called ASD indicating a connection maintenance failure to the ASMS if the connection is not maintained during the predetermined period.

24. The method of claim 9, further comprising the ASD performing testing and transmitting test results to the ASMS.

25. A method comprising:
receiving a command execution mode signal from an air surveillance and maintenance server (ASMS) across a wireless network; and
performing a call setup testing at an air surveillance device (ASD) based on the received command execution mode signal, wherein performing the call setup testing includes:
sending a called ASD a call setup request;
determining a connection acknowledgment from the called ASD; and
sending a message indicating a successful call setup after receiving the connection acknowledgment from the called ASD.

26. The method of claim 25, wherein the calling ASD repeats sending the call setup request to the called ASD until a number of repetitions is equal to a predetermined value, and then the calling ASD sending a message to the ASMS indicating a call setup failure.

27. A method comprising:
receiving a command execution mode signal from an air surveillance and management server (ASMS) across a wireless network; and
performing connection maintenance testing at an air surveillance device (ASD) based on the received command execution mode signal from the ASMS, wherein performing the connection maintenance testing includes:
sending a called ASD a call setup request;
determining a connection acknowledgment received from the called ASD;
sending a message to the ASMS indicating a connection maintenance failure when the connection acknowledgment is not received;
determining whether the connection is maintained during a predetermined period; and
sending a message indicating successful connection maintenance.

28. The method of claim 27, wherein the calling ASD repeats sending the call setup request to the called ASD until a number of repetitions is equal to a predetermined value, and then the calling ASD sending a message to the ASMS indicating a call setup failure.

29. A method comprising:
receiving a command execution mode signal from an surveillance and maintenance server (ASMS) across a wireless network; and
performing connection maintenance testing at an air surveillance device (ASD) based on the received command execution mode signal, wherein performing the connection maintenance testing includes:
determining whether there is a connection maintenance test request;
sending a connection acknowledgment to a calling ASD if there is a connection maintenance test request;
sending a message indicating a successful call setup to the ASMS;
determining whether the connection is maintained during a predetermined period; and
sending a message indicating a successful connection maintenance to the ASMS if the connection is maintained during the predetermined period.

30. The method of claim 29, wherein performing the connection maintenance test further includes:
sending a message from the called ASD to the ASMS indicating a connection maintenance failure if the connection is not maintained during the predetermined period.

* * * * *